United States Patent
Odenwald, Jr.

(10) Patent No.: US 7,080,197 B2
(45) Date of Patent: Jul. 18, 2006

(54) SYSTEM AND METHOD OF CACHE MANAGEMENT FOR STORAGE CONTROLLERS

(75) Inventor: Louis H. Odenwald, Jr., Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 147 days.

(21) Appl. No.: 10/125,712

(22) Filed: Apr. 18, 2002

(65) Prior Publication Data

US 2003/0200389 A1  Oct. 23, 2003

(51) Int. Cl.
*G06F 12/00* (2006.01)
*G06F 12/16* (2006.01)

(52) U.S. Cl. .................... 711/114; 711/141
(58) Field of Classification Search ............ 711/113, 711/114, 119, 120, 124, 133
See application file for complete search history.

(56) References Cited

U.S. PATENT DOCUMENTS 6,052,758 A * 4/2000 Crockett et al. ............ 711/113
6,073,218 A * 6/2000 DeKoning et al. .......... 711/150
2001/0002480 A1* 5/2001 Dekoning et al. .......... 711/130
2003/0126347 A1* 7/2003 Tan et al. .................... 710/313

OTHER PUBLICATIONS

IBM International Technical Support Organization, "Planning for IBM Remote Copy," International Business Machines Corp., 1995, pp. 98, 131-132.*

* cited by examiner

Primary Examiner—Pierre Vital
(74) Attorney, Agent, or Firm—Suiter West Swantz PC LLO

(57) ABSTRACT

The present invention is directed to a system and method of cache management for storage controllers. In an aspect of the present invention, a system for storing electronic data may include a host and a data storage apparatus communicatively coupled to the host. The host has cache coherency functionality. The data storage apparatus includes a first storage controller communicatively coupled to at least one storage device, the first storage controller further coupled to a first cache. A second storage controller is also included, which is communicatively coupled to at least one storage device, the second storage controller further coupled to a second cache. The cache coherency functionality of the host provides coherency of the first cache coupled to the first storage controller with the second cache coupled to the second storage controller.

20 Claims, 4 Drawing Sheets

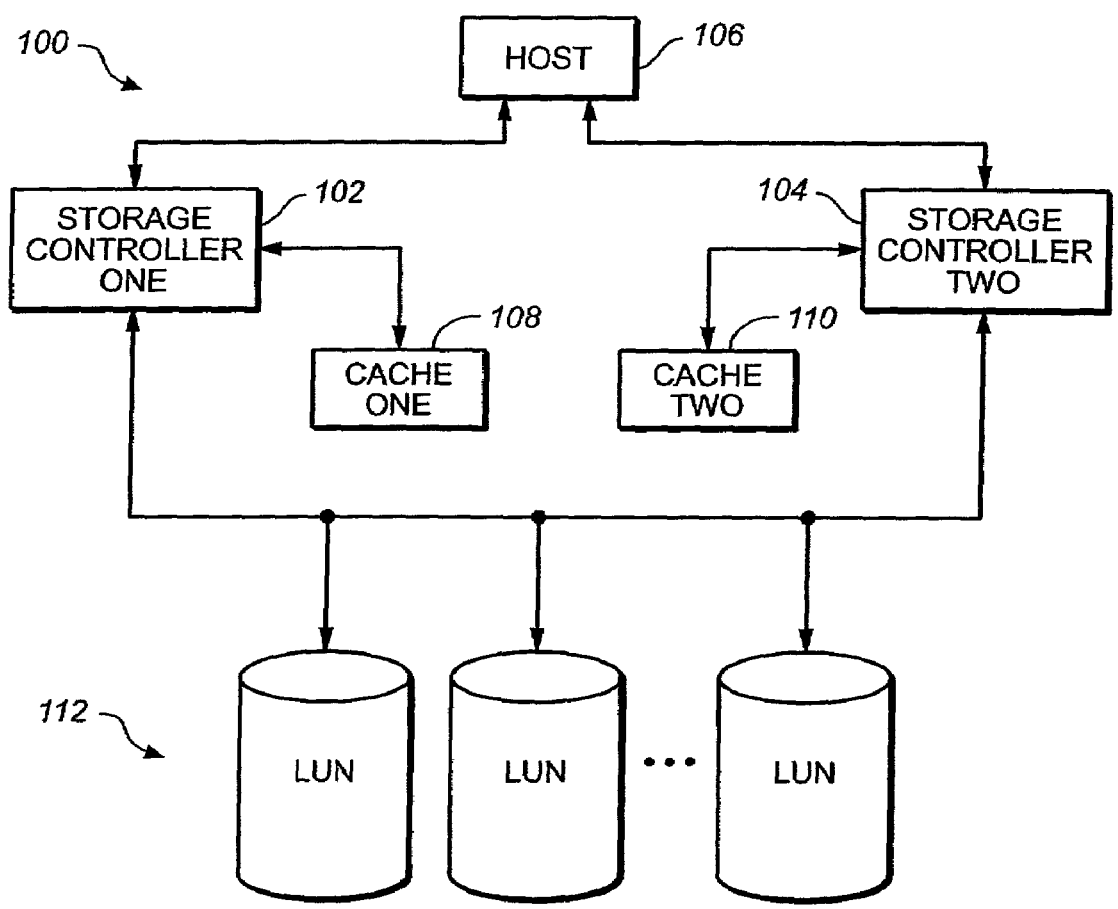
FIG._1

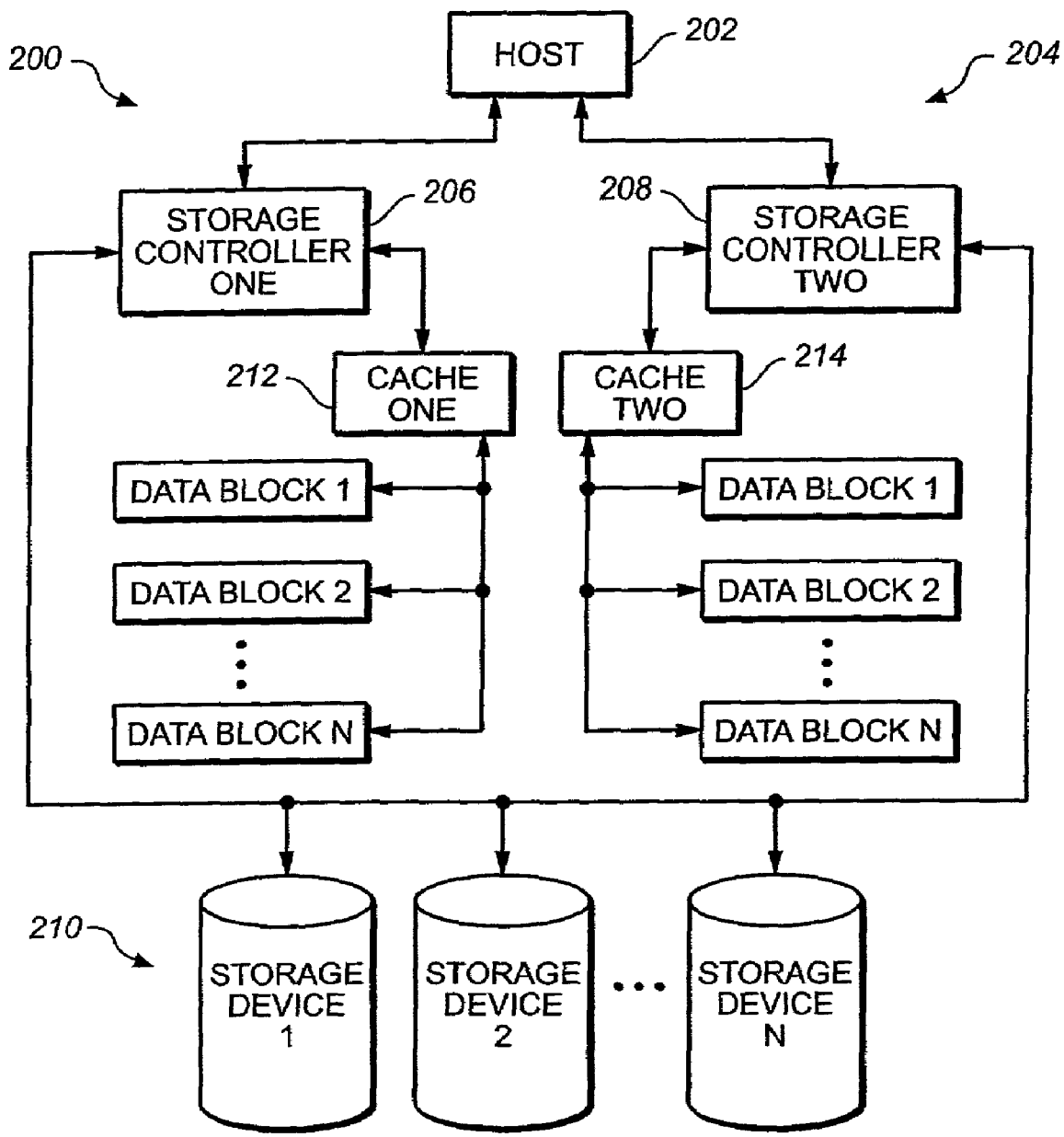
FIG._2

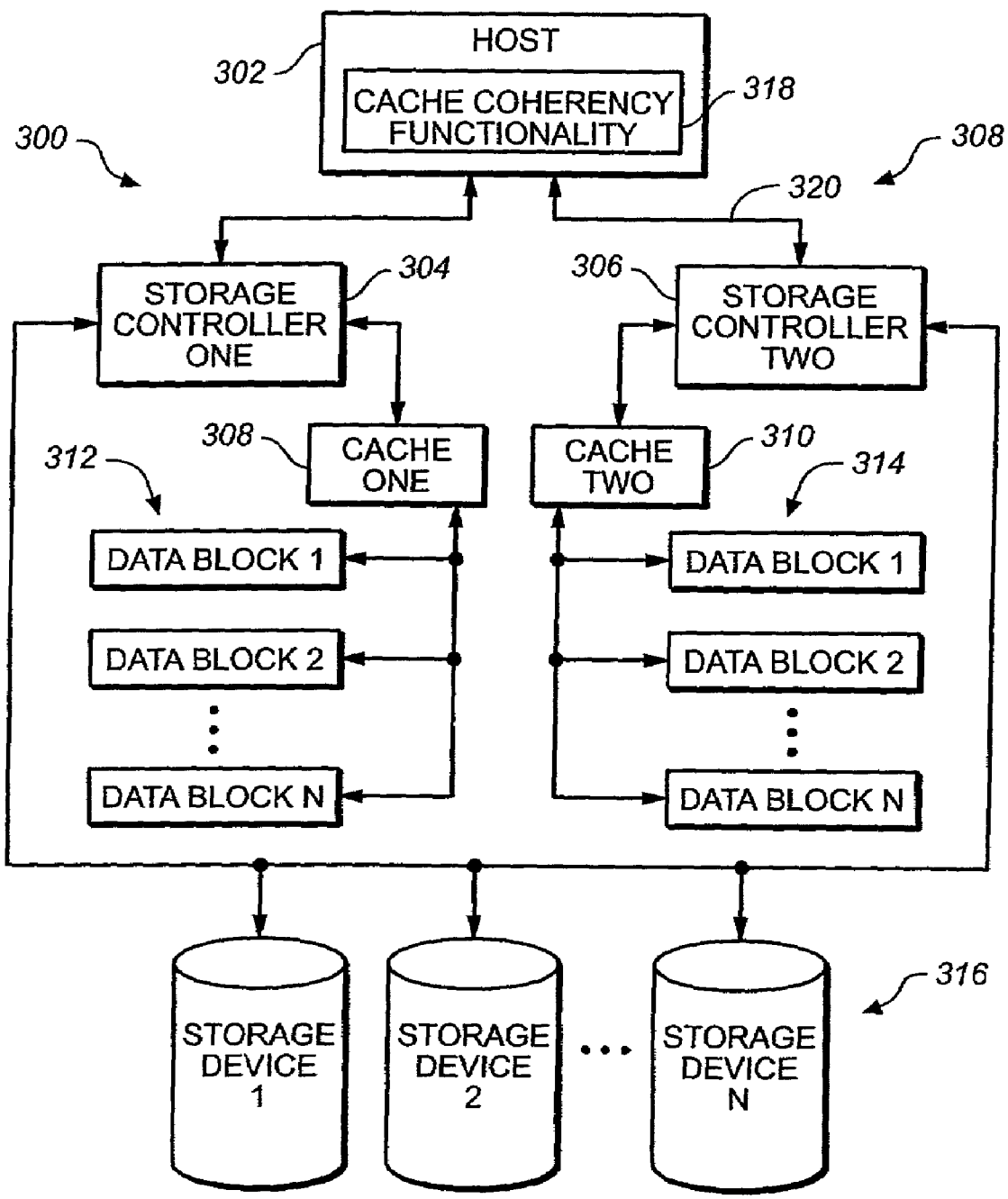
FIG._3

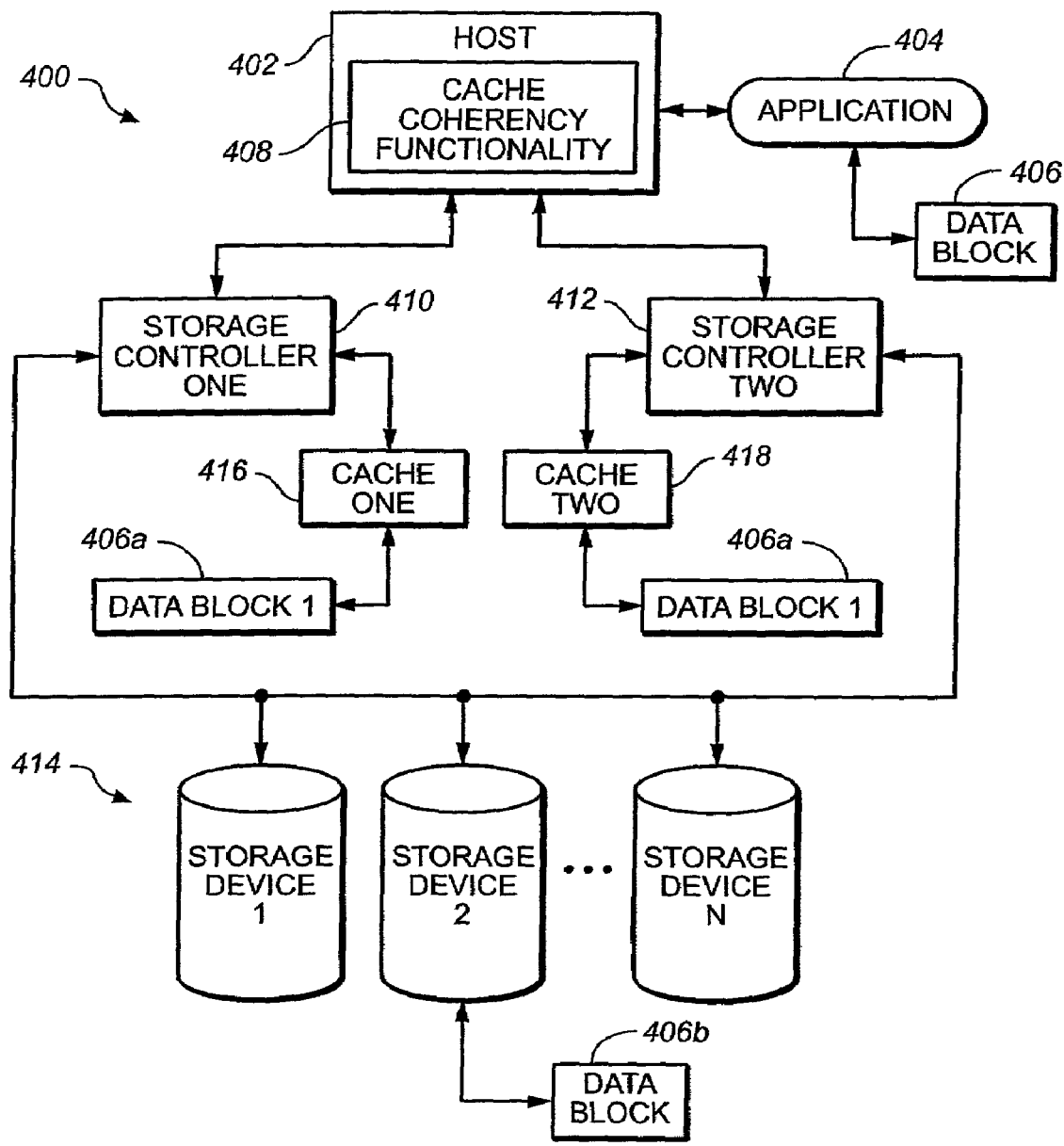
*FIG._4*

SYSTEM AND METHOD OF CACHE MANAGEMENT FOR STORAGE CONTROLLERS

FIELD OF THE INVENTION

The present invention generally relates to the field electronic data storage, and particularly to a system for cache management for storage controllers by a host, such cache management suitable for providing cache coherency of multiple caches linked to multiple storage controllers.

BACKGROUND OF THE INVENTION

The storage of electronic data is one of the most important aspects of the digital age as consumers and businesses increasingly rely on persistent, efficient and reliable access to this necessary data. Because of the importance of this data, a variety of methods and systems have been developed to provide redundant and efficient data access to ensure the availability of the data.

Redundant arrays of independent disks (RAID) have been provided to ensure such data availability. RAIDs may include multiple storage devices having mediums for storage of electronic data and depending on the protocol used, data may be obtained even in the event of failure of one of the storage devices. However, the amount of storage needed by a user may require that a data storage apparatus be specially configured to provide the desired throughput and storage quantity.

For instance, in a smaller environment, a singe RAID may be provided having redundant storage devices for storage of all the information necessary for a small business. In an enterprise solution, vast arrays of storage systems may need to be provided, having pluralities of controllers, storage devices, and caches.

Between the enterprise solutions needed by large businesses and a single RAID used by small businesses and individuals are mid-range solutions. Many mid-range RAID solutions rely on pairs of controllers operating dependently to both increase performance and add redundancy. Typically each controller will own a unique set of logical unit numbers, and operate somewhat autonomously. Another characteristic of mid-range solutions is that, typically, multiple caches are employed, such as one for each controller. These caches must be periodically synchronized with one another so that each controller may be prepared to take over partner LUNs in the event of a controller failure. Such synchronization may require specialized resources within the storage device and consume valuable apparatus resources, thereby making the solution more expensive and less desirable.

Therefore, it would be desirable to provide a system and method for cache management for storage controllers.

SUMMARY OF THE INVENTION

Accordingly, the present invention is directed to a system and method of cache management for storage controllers. In an aspect of the present invention, a system for storing electronic data includes a host and a data storage apparatus communicatively coupled to the host. The host has cache coherency functionality. The data storage apparatus includes a first storage controller communicatively coupled to at least one storage device, the first storage controller further coupled to a first cache. A second storage controller is also included, which is communicatively coupled to at least one storage device, the second storage controller further coupled to a second cache. The cache coherency functionality of the host provides coherency of the first cache coupled to the first storage controller with the second cache coupled to the second storage controller.

In an additional aspect of the present invention, a system for storing electronic data includes a host having cache coherency functionality and at least one data storage apparatus communicatively coupled to the host. The data storage apparatus includes at least two storage controllers communicatively coupled to at least two storage devices, the at least two storage controllers each having a cache. The cache coherency functionality of the host provides coherency of the caches coupled to the at least two storage controllers by mirroring the storage controllers.

In a further aspect of the present invention, a method of storing data from a host to a data storage apparatus includes obtaining data by a host. The obtained data is mirrored to at least two storage controllers of at least one data storage apparatus, the storage controllers each having at least one cache.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 1 is an illustration of an embodiment of the present invention wherein cache coherency is provided by a host thereby enabling LUNs to be viewable through either controller;

FIG. 2 is an illustration of an embodiment of the present invention wherein a host includes cache coherency functionality to provide synchronized caches with minimal data storage apparatus resource usage;

FIG. 3 is an illustration of an embodiment of the present invention wherein cache coherency functionality included in a host provides controller mirroring for data storage apparatus synchronization; and FIG. 4 is an illustration of an embodiment of the present invention wherein data obtained by a host is mirrored to at least a first storage controller and a second storage controller.

DETAILED DESCRIPTION OF THE INVENTION

Reference will now be made in detail to the presently preferred embodiments of the invention, examples of which are illustrated in the accompanying drawings.

Referring generally now to FIGS. 1 through 4, exemplary embodiments of the present invention are shown. Many mid-range redundant arrays of independent disks (RAID) solutions rely on pairs of controller operating dependently to both increase performance and add redundancy. Typically, each controller owns a unique set of logical unit numbers (LUNs) and operates somewhat autonomously. Another characteristic of mid-range solutions is that multiple caches may be provided, once in each controller. Having multiple caches adds to system redundancy, but it also dramatically increases complexity of overall system design. These caches must periodically be synchronized with one another so that each controller may be prepared to take over a partner controller's logical unit numbers in the event of the controller's failure. Multiple caches are a differentiating factor between many mid-range RAIDs, and larger enterprise class solutions. For example, enterprise solutions may have a single cache to simplify the design by removing the need for cache coherency, and removes the LUN ownership quagmire.

As mentioned, in many mid-range RAIDs, controllers typically own a unique set of logical unit numbers (LUNs). A side-affect of this ownership is that a LUN may only be accessed through a single controller, whereas in enterprise solutions having a single cache, this problem is not encountered. Therefore, I/Os for a specific LUN may be issued through multiple controllers.

Typically, mid-range RAIDS require specific hardware and/or require system resources in order to synchronize the caches, such as through an internal bus, on the backside (drive side) of the controllers, and the like. Having to periodically synchronize caches themselves adds to the complexity and cost of a design. Additionally, multiple caches which are not synchronized 100% of the time may require LUN ownership. This, in turn, adds to the complexity of the system in the event of a controller failover and prohibits load balancing. However, in the present invention, cache coherency functionality is provided by a host 106, thereby synchronizing the caches 108 & 110 of the corresponding controllers 102 & 104 with an efficient use of system resources, as shown in FIG. 1. Thus, all LUNs 112 will be viewable through both controllers 102 & 104, thereby enabling a variety of functionality.

Referring now to FIG. 2, an embodiment 200 of the present invention is shown wherein a host includes cache coherency functionality to provide synchronized caches with minimal data storage apparatus resource usage. A host 202 is communicatively coupled to a data storage apparatus 204. The data storage apparatus 204 includes a first storage controller 206 and a second storage controller 208. The storage controllers are communicatively coupled to storage devices 210 for storage of electronic data on media, preferable to provide nonvolatile storage. The storage devices 210 and the data stored thereon may be "seen" as LUNs, i.e. as abstractions of the data stored on the storage devices, through use of the storage controllers to store and access data on the storage devices.

To increase the efficiency of the storage controllers 206 & 208, each storage controller is communicatively coupled to a cache. For example, as shown in FIG. 2, the first storage controller is coupled to a first cache 212 and the second storage controller 208 is coupled to a second cache 214. The caches 212 & 214 provide data staging so that data may be accessed in a timely manner. For example, the caches 212 & 214 may be utilized to stage data in anticipation of host 202 use so that the data may be fetched and ready without read latency. Additionally, data may be cached when received from a host 202 by the storage controllers 206 & 208 for writing to the storage devices 210. Thus, data may be stored before it is written to the storage devices 210 in order to more efficiently provide data due to latency of the storage devices in the ability to receive and write data. A variety of other uses of a cache are contemplated by the present invention without departing from the spirit and scope thereof.

Multiple storage controllers 206 & 208 may be provided to offer persistent data access should one of the storage controllers fail, pathways to a storage controller become inaccessible, and the like. However, as previously stated, by providing multiple caches with multiple storage controllers, synchronization issues may be encountered which previously required specialized hardware and/or additional system resources. However, the present invention provides cache coherency function "above" the data storage apparatus layer 204 at the host 202 so that the caches 212 & 214 of the controllers 206 & 208 are synchronized. In this way, should one controller become unavailable, the other controller may be utilized without a concern for cache coherency.

Referring now to FIG. 3, an embodiment 300 of the present invention is shown wherein cache coherency functionality included in a host provides controller mirroring for data storage apparatus synchronization. A host 302 is communicatively coupled to a first storage controller 304 and a second storage controller 306. These controllers 304 & 306 may be grouped as a data storage apparatus 308 regardless of physical location of the controllers 304 & 306 with respect to each other.

The first storage controller 304 includes a first cache 308 and the second storage controller 306 includes a second cache 310 for staging data 312 & 314. The data 312 & 314 may be staged before being provided to the host 302, the storage devices 316, and the like.

To provide data coherency between the storage controllers 304 & 306 and the corresponding caches 308 & 310 and storage devices 316, the host 302 provides cache coherency functionality 318. The host 302 may provide such coherency by mirroring the controllers 304 & 306. Thus, the host 302, such as a server, host bus adapter residing on a server, information handling system, and the like, through the cache coherency functionality 320 enables the caches 304 & 306 to operate in a manner similar to a single cache.

By mirroring controller 304 & 306, the multiple caches 308 & 310 may function similar to the single cache found in enterprise class solutions. Additionally, the controller 304 & 306 architecture may be simpler because there is no longer a need for the controllers 304 & 306 to manage the cache coherency. This simplification may in turn result in a reduction in cost of a data storage apparatus and system incorporating the present invention.

Additionally, because of the coherency of the caches 304 & 306, there is no longer the need for LUN ownership by a single controller. Therefore, all of the LUNs may be accessible through either controller, which enables multipathing features, load balancing features, and the like as contemplated by a person of ordinary skill in the art.

For example, there is no longer a need for controller failover, because the recovery may be provided by a failover to an alternate path. For instance, should the first storage controller 304 become inaccessible, the second storage controller 306 may be utilized to access the same data 316, the cache 310 of the second storage controller 306 having the same data as that stored in the first cache 308. The second storage controller 306 is accessible to the host 302 merely by specifying the path 320 to the second storage controller 302 through use of the present invention.

Referring now to FIG. 4, an embodiment 400 of the present invention is shown wherein data obtained by a host is mirrored to at least a first storage controller and a second storage controller. A host 402 may obtain data 406 from a variety of sources for storage on storage devices, such as transferred from an information handling system to the host, from an application 404 operating on the host, over a network connection, and the like.

To ensure that the data 406 is available even in an instance of failure of a data storage device, data transfer path, and the like, the host, through the cache coherency functionality 408 mirrors the data to at least a first storage controller 410 and a second storage controller 412. Because data may be transferred more quickly to the first storage controller 410 and the second storage controller 412 than the controllers 410 & 412 and the storage devices 414 may write the data, caches 416 & 418 are provided for the storage controllers. Thus, the data blocks 406a may be stored by the caches to allow for further operations by the system and minimize bottlenecks. Once the storage devices 414 are ready to receive the data for writing, the data 406b is transferred to the storage devices 414 for nonvolatile storage.

It should be noted that in this embodiment, should failure of either of the storage controllers 410 & 412, caches 418 & 420, data storage devices 414, or pathways connecting the components become inaccessible or fail, a redundant copy of the data is provided by a mirrored controller in a manner similar to the failed system. Thus, the data may be obtained and manipulated without entering detailed failover conditions which involve synchronizing and the like. Rather, the present invention may provide access to the data in an efficient manner by a specified path by the host. Further, although two mirrored storage controllers are described, additional mirrored storage controllers may be provided to further provide data redundancy and access.

In exemplary embodiments, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the system and method of the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A system for storing electronic data, comprising:
    a host having cache coherency functionality; and
    a data storage apparatus communicatively coupled to the host, the data storage apparatus including,
        a first storage controller communicatively coupled to at least one storage device, the first storage controller further coupled to a first cache;
        a second storage controller communicatively coupled to one or more storage devices, the second storage controller further coupled to a second cache; and
        a plurality of storage devices suitable for being accessed by the first storage controller and the second storage controller,
        wherein the first cache and the second cache are not included in a single centralized cache,
    wherein the cache coherency functionality of the host provides coherency of the first cache coupled to the first storage controller with the second cache coupled to the second storage controller whereby the coherency of the first cache and the second cache is maintained without requiring periodic cache synchronization,
    wherein the first and second cache operate in a manner similar to a single cache by providing persistent data access without requiring periodic synchronization when at least one of: a storage controller included in the plurality of storage controllers; a storage device included in the plurality of storage devices; a cache included in the plurality of caches; and a data pathway to a storage controller included in the plurality of storage controllers becomes inaccessible.

2. The system as described in claim 1, wherein cached coherency provides ability of the first storage controller and the second storage controller to operate without ownership of logical unit numbers (LUNs).

3. The system as described in claim 1, wherein logical unit numbers (LUNs) in the data storage apparatus are visible through either controller.

4. The system as described in claim 3, wherein at least one of multipathing and load balancing is provided.

5. The system as described in claim 1, wherein if the first storage controller is inaccessible, the second storage controller is accessed through an alternate path.

6. The system as described in claim 1, wherein the cache coherency functionality operates to mirror the first storage controller and the second storage controller.

7. The system as described in claim 1, wherein the data storage apparatus is configured as a redundant array of independent disks (RAID).

8. A system for storing electronic data, comprising:
    a host having cache coherency functionality; and
    at least one data storage apparatus communicatively coupled to the host, the data storage apparatus including at least two storage controllers communicatively coupled to at least two storage devices, the at least two storage controllers each having a cache, and a plurality of storage devices suitable for being accessed by the at least two storage controllers,
    wherein the first cache and the second cache are not included in a single centralized cache,
    wherein the cache coherency functionality of the host provides coherency of the caches coupled to the at least two storage controllers by mirroring the storage controllers whereby the coherency of the caches coupled to the at least two storage controllers is maintained without requiring periodic cache synchronization,
    wherein the first and second cache operate in a manner similar to a single cache by providing persistent data access without requiring periodic synchronization when at least one of: a storage controller included in the at least two storage controllers; a storage device included in the at least two storage devices: a cache included in the plurality of caches; and a data pathway to a storage controller included in the at least two storage controllers becomes inaccessible.

9. The system as described in claim 8, wherein cached coherency provides ability of the storage controllers to operate without ownership of logical unit numbers (LUNs).

10. The system as described in claim 8, wherein logical unit numbers (LUNs) in the data storage apparatus are visible through either of the at least two controllers.

11. The system as described in claim 10, wherein at least one of multipathing and load balancing is provided.

12. The system as described in claim 8, wherein if a first storage controller of the at least two storage controllers is inaccessible, a second storage controller of the at least two storage controllers is accessed through an alternate path.

13. The system as described in claim 8, wherein the data storage apparatus is configured as a redundant array of independent disks (RAID).

14. A method of storing data from a host to a data storage apparatus, comprising:
- obtaining data by a host; and
- mirroring the obtained data by the host to at least two storage controllers of at least one data storage apparatus, the storage controllers each having at least one cache, wherein the at least one data storage apparatus includes a plurality of storage devices suitable for being accessed by the at least two storage controllers;
- providing coherency of the at least one cache coupled to each of the storage controllers, wherein the coherency of the at least one cache coupled to each of the storage controllers is maintained without requiring periodic cache synchronization,
- wherein each cache of the storage controllers does not form a single centralized cache together,
- wherein the plurality of caches operate in a manner similar to a single cache by providing persistent data access without requiring periodic synchronization when at least one of: a storage controller included in the at least two storage controllers; a storage device included in the plurality of storage devices; a cache included in the plurality of caches; and a data pathway to a storage controller included in the at least two storage controllers becomes inaccessible.

15. The method as described in claim 14, wherein the data is obtained from at least one of an application operating on the host and from a remote source.

16. The method as described in claim 14, wherein the mirrored data provides ability of the storage controllers to operate without ownership of logical unit numbers (LUNs).

17. The method as described in claim 14, wherein logical unit numbers (LUNs) in the data storage apparatus are visible through either of the at least two controllers.

18. The method as described in claim 17, wherein at least one of multipathing and load balancing is provided.

19. The method as described in claim 14, wherein if a first storage controller of the at least two storage controllers is inaccessible, a second storage controller of the at least two storage controllers is accessed through an alternate path.

20. A system for storing electronic data, comprising:
- a host having means for managing cache coherency; and
- at least one data storage apparatus communicatively coupled to the host, the data storage apparatus including at least two means for controlling data storage operations communicatively coupled to at least one means for storing data, the at least two controlling means each having a means for caching;
- wherein the at least one data storage apparatus maintains a plurality of data blocks which are shared by the at least two means for controlling data storage operations;
- wherein the cache coherency means of the host provides coherency of the caching means coupled to the at least two controlling means whereby the coherency of the caching means coupled to the at least two controlling means is maintained without requiring periodic cache synchronization
- wherein each of the cache means does not form a single centralized cache together,
- wherein the plurality of caching means operate in a manner similar to a single caching means by providing persistent data access without requiring periodic synchronization when at least one of: a controlling means included in the at least two controlling means; a means for storing data included in the at least one data storing means; a caching means included in the plurality of caching means; and a data pathway to a controlling means included in the at least two controlling means becomes inaccessible.

* * * * *